Nov. 1, 1966    L. W. CULMONE    3,281,968

DICTATION TEACHING AID

Original Filed June 4, 1964

INVENTOR.
Louis W. Culmone
BY
Robert F. Beck
ATTORNEY

United States Patent Office 3,281,968
Patented Nov. 1, 1966

3,281,968
DICTATION TEACHING AID
Louis W. Culmone, Rockaway, N.J., assignor to Lustro Watch Incorporated, a corporation of New Jersey
Continuation of abandoned application Ser. No. 372,592, June 4, 1964. This application Jan. 26, 1966, Ser. No. 545,514
9 Claims. (Cl. 35—35)

My invention relates to shorthand and stenotyping and more particularly to the teaching thereof. This application is a continuation of my copending patent application, Serial No. 372,592, filed June 4, 1964 now abandoned.

In the teaching of shorthand or stenotyping, it is customary for many instructors to dictate material at various speeds within a selected time span to enable the students to acquire the necessary proficiency in taking down the material at such speeds. For convenience in timing the dictation of the material relative to a selected time span, the material is usually divided into groups composed of twenty-eight shorthand signs or syllables, or, as often loosely characterized, twenty standard shorthand words per group. Thus, groups totaling a selected number of words may be chosen and dictated at a speed deemed by the instructor to terminate the dictation at the end of a preselected time span.

Unfortunately, this practice is frequently unsatisfactory because the actual dictating speed may be such that the dictation will terminate before or after the end of a time span. In attempts to overcome inaccuracy of this type, some instructors employ a stop watch having a single scale graduated in seconds and fractions thereof for checking the speed of dictation at various intervals during the time span to enable them to compute by the single scale the elapsed time of the dictation and subtract the same from the time span, while still dictating, in order that the speed of the dictation may be changed, if necessary, to finish the dictation at the end of the time span. This mathematical indulgence often confuses an instructor to the extent that it prevents full concentration on the material and clear enunciation of the words being dictated, interferes with the cadence of the dictation, and tends to effect deceleration of dictation. Having then fallen behind, the instructor must accelerate his dictation rate to catch up. This deceleration and acceleration causes a sporadic dictation rate.

My invention overcomes the foregoing unsatisfactory results and disadvantages, it being one of the objects thereof to provide means for indicating the elapsed time of dictation of each of the groups dictated without resort to computation thereby enabling the instructor without distraction to readily adjust the dictating speed to one whereby the dictation will terminate at the end of the selected time span.

Another object of my invention is to provide timing means in combination with dictating material and which timing means denotes the elapsed time of dictation at various speeds within a definite time span.

Another object of my invention is to provide a dial for use in conjunction with a stop watch or the like and which dial is provided with a plurality of different elapsed time indicating zones or bands for denoting different speeds of dictation, respectively, within a selected time span.

A further object of my invention is to provide a dial of the foregoing described character wherein the bands are clearly distinguishable from each other to preclude confusion on the part of an instructor.

A still further object of my invention is to provide a dial of the foregoing described character wherein the bands are arranged in circumjacent relation wherein the groups of words are progressively indicated as to number from the innermost band outwardly thereby enabling the instructor to more easily perceive the progress of the dictation.

An important object of my invention is to provide a dial of the foregoing described character which is simple and economical in construction and capable of being incorporated within stop watches without modification of the movements thereof.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

FIGURE 1 is a face view of a stop watch equipped with my novel form of dial;

FIGURE 2 is an end elevation of the dial; and

FIGURE 3 is a diagrammatic plan view of a member containing dictating material.

In practicing my invention, as illustrated in the drawing, I provide a timing device, for instance, a stop watch 10 having a horological dial 11 and which watch is equipped with the usual second hand 12 for circular movement about the face of the dial 11. The watch is equipped with a crown 13 for winding the watch and to effect starting, stopping, and return of the second hand 12 to its zero or starting position 14 relative to the dial.

In the present instance, the face of the dial 11 is provided with a fourfold of circular zones or bands 15, 16, 17, and 18, respectively, disposed one within another in circumjacent and progressive relation outwardly and which bands may be of contrasting colors including black and/or white. The face of the dial 11 is provided about the outer periphery of the outermost band 18 with a scale 19 graduated to define sixty seconds of time per minute, the zero or starting position 14 of the hand 12 being at the mark indicated by the numeral sixty of the scale 19.

Each of the bands are graduated to indicate, by scale marks and numerals 20, the groups and total number of word chosen for dictation within a time span of one minute. In this connection it will be noted that the bands 15, 16, 17, and 18 are divided by the marks 20 into periods to denote three, four, five, and six groups of twenty standard words each for a total of sixty, eighty, one hundred, and one hundred twenty standard words per minute, respectively.

The dictating material or indicia 23 is printed or otherwise depicted on the member 24 shown in FIGURE 3 and which material is divided into the aforementioned groups of twenty standard words with the parenthesized numerals indicating the end and total number of the groups employed. The member 24 may constitute a card, page of an instruction manual, or other suitable media on which the material is printed. Inasmuch as the dictating material 23 is diagrammatically depicted on the member 24 of FIGURE 3, it is, in the interest of clarity, set forth in detail as follows:

Dear Dick: In our talk several days ago you mentioned that you were going to send in your tax blank even though (1) you were not certain whether you should include or omit a few items. I think, Dick, that you would be making a (2) mistake.

I did not have an opportunity to discuss this with you at the time; so I am writing you this (3) brief note. I am inclined to feel, frankly, that you would save yourself much trouble by seeing a good lawyer or (4) accountant. Do not depend on your own solution of problems about which you are puzzled.

Postpone sending in the (5) return for a day or so. As long as your return is postmarked April 15, it will be on time.

If you want a (6) good, practical lawyer, may I suggest my friend, John Fox, who transacts my legal business and supervises my (7) affairs in general. He is an authority on tax matters. He will be able to tell you in a matter (8) of minutes what items you should include and what items you may deduct. Very sincerely, yours, (9)

In use, assuming by way of example, that it is desired to dictate material at a speed of eighty standard words per minute, the instructor selects four groups of the words for dictation from the member 24 together with the band 16 of the dial for observation and then initiates starting of the second hand 12 simultaneously with the commencing of the dictation. As the dictation progresses, the instructor observes the position of the second hand with respect to the band 16 for indicating the elapsed time of each group dictated thereby enabling the instructor to vary the speed of dictation, if necessary, for termination at the end of the time span of sixty seconds or one minute without resort to the heretofore mentioned distracting computation. Obviously, my novel form of dial permits an instructor to dictate a preselected amount of dictating material at a substantially constant speed to terminate at the end of a preselected time span.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What is claimed as the invention is:

1. A teaching aid comprising in combination with dictating material divided into substantially equal groups of words, each of said groups having a character indicating the end of a group and located at the end of said group, means for enabling dictation of said material at a preselected average rate, said means comprising a stop-watch including a dial and a second hand, said dial having a plurality of concentric circular bands thereon, each of said bands having graduations drawn to a different scale to enable dictation at a different preselected average rate, each of said bands having identifying indicia to indicate the dictation rate that said band will enable the graduations on each of said bands corresponding to said end of group characters, a preselected average dictation rate being maintained by controlling dictation so that the end of group characters are reached during dictation as said second hand passes adjacent the graduations on the single band corresponding to said preselected average rate.

2. The invention of claim 1 wherein said bands are of contrasting colors so that a selected band may be readily distinguished.

3. The invention of claim 1 wherein all of the graduations on each of said bands are like the identifying indicia so that the selected band may be readily distinguished.

4. Dictation pacing means comprising in combination with dictation material divided into equal groups of words, said groups being separated by end of group identifying indicia, a stop-watch including a dial and a second hand, said dial having a plurality of circular bands thereon, each of said bands having graduations drawn to a different scale to enable dictation at a different preselected average rate, the graduations on each of said bands corresponding to said end of group identifying indicia so that the reader of said dictation material is paced to dictate at a preselected average rate by observing a preselected one of said bands in accordance with the selected dictation rate and increasing the rate of dictation if said end of group identifying indicia is reached after said second hand has passed a graduation and decreasing the rate of dictation if said end of group identifying indicia is reached prior to said second hand having reached the next graduation.

5. The invention of claim 4 wherein each of said bands have identifying indicia to indicate the average speed that said band will enable.

6. The invention of claim 5 wherein the number of said graduations on each of said bands equals the number of said word groups that should be dictated in the period of a complete revolution of said second hand in accordance with the average speed that said bands will enable.

7. The invention of claim 6 wherein all of said graduations on a band are comprised of numerals like the identifying indicia of said band.

8. The invention of claim 7 wherein said second hand makes a complete revolution in one minute and said identifying indicia and graduations on said band are in units indicating the number of words per minute.

9. The invention of claim 5 wherein said bands are of contrasting colors so that the selected band may be readily distinguished from the remaining bands on said dial.

References Cited by the Examiner
UNITED STATES PATENTS

| 1,572,884 | 2/1926 | Colvin. | |
| 3,111,003 | 11/1963 | Droz | 58—126 |
| 3,239,950 | 3/1966 | Conry | 35—35 |

OTHER REFERENCES

Minerva Catalog No. 261, M. Ducommun Co., N.Y., page 6 (received in U.S. Patent Office Scientific Library, April 15, 1961).

EUGENE R. CAPOZIO, *Primary Examiner.*

W. GRIEB, *Assistant Examiner.*